United States Patent [19]

Aitken

[11] Patent Number: 5,022,921
[45] Date of Patent: Jun. 11, 1991

[54] PHOSPHATE GLASSES FOR GLASS MOLDS
[75] Inventor: Bruce G. Aitken, Painted Post, N.Y.
[73] Assignee: Corning Incorporated, Corning, N.Y.
[21] Appl. No.: 599,743
[22] Filed: Oct. 19, 1990
[51] Int. Cl.⁵ .............................................. C03C 3/17
[52] U.S. Cl. ...................................... 106/38.9; 501/48
[58] Field of Search .......................... 501/48; 106/38.9
[56] References Cited

U.S. PATENT DOCUMENTS

| | | | |
|---|---|---|---|
| 2,381,925 | 8/1945 | Pincus | 501/48 |
| 2,400,147 | 5/1946 | Hooley | 501/48 |
| 2,434,281 | 1/1948 | Moulton | 501/48 |
| 2,577,627 | 11/1951 | Pincus | 501/48 |
| 3,979,322 | 9/1976 | Alexeev et al. | 501/48 |
| 4,026,714 | 5/1977 | Lewis | 501/48 |
| 4,248,732 | 2/1981 | Myers et al. | 501/45 |
| 4,439,530 | 3/1984 | Tajima | 501/48 |
| 4,874,724 | 10/1989 | Beall et al. | 501/48 |
| 4,940,677 | 7/1990 | Beall et al. | 501/45 |

*Primary Examiner*—Mark L. Bell
*Attorney, Agent, or Firm*—C. S. Janes, Jr.

[57] ABSTRACT

This invention is particularly directed to the production of glass molds for use in press molding optically finished lenses. The inventive glass compositions consist essentially, in mole percent, of 34–56% ZnO, 4–14% $Al_2O_3$, 40–52% $P_2O_5$, and up to 15% total of optional modifying oxides including up to 5% $Li_2O$ and/or $Na_2O$ and/or $K_2O$, up to 5% $Sb_2O_3$, and up to 15% total of CaO and/or SrO and/or BaO.

6 Claims, No Drawings

PHOSPHATE GLASSES FOR GLASS MOLDS

RELATED APPLICATION

U.S. Ser. No. 599,751, filed concurrently by me under the title FLUORINE-FREE PHOSPHATE GLASSES, is directed to the production of glasses having base compositions within the alkali metal, alkaline earth metal, zinc phosphate field which are particularly desirable for press molding optically finished glass lenses.

BACKGROUND OF THE INVENTION

Optically finished glass lenses press molded from alkali metal fluoroaluminophosphate compositions as disclosed in U.S. Pat. No. 4,362,819 (Olszewski et al.) have been marketed commercially by Corning Incorporated, Corning, N.Y. The molds utilized in that forming process have been prepared from various commercially available lead silicate glasses The use of the glasses in the fabrication of molds was based primarily upon two factors, viz., their viscosity/temperature characteristics and their thermal expansions. With respect to the first factor, the glass to be used as the mold must itself not only be moldable at a relatively low temperature, typically within the range of about 450°-560° C., but also it must be rigid at the temperature at which the lens blanks are pressed, generally about 350°-400° C. On the basis of known viscosity/temperature slopes, that requirement translates into a range of glasses having softening points between about 500°-620° C. With regard to the second factor, the linear coefficient of thermal expansion of the mold glass over the temperature interval 25°-300° C. must lie between about $46-142 \times 10^{-7}/°C.$ in order to be compatible with the various metals employed in the pressing apparatus. Furthermore, experience has indicated that: first, the linear coefficient of thermal expansion of the mold glass ought to be considerably lower than that of the lens glass (generally about $150 \times 10^{-7}/°C.$ over the temperature interval 25°-300° C.) so that the molded glass lens will tend to release from the mold upon cooling from the pressing temperature; and, second, that the linear coefficient of thermal expansion of the mold glass ought to be substantially greater than that of the molding sleeve (commonly prepared from tungsten carbide which has a linear coefficient of thermal expansion of $46 \times 10^{-7}/°C.$ over the temperature interval 25°-300° C.) so that the finished mold is readily extractable from the molding assembly.

The lead silicate glasses currently employed for making the molds have five significant drawbacks:

First, because their bulk compositions differ greatly from that of the lens glass, the large chemical gradients that exist at the interface between the mold and the lens during the pressing process favor mass transfer between the two glasses;

Second, it is believed that, because it is a silicate, the mold glass is especially susceptible to attack by the fluorine of the lens glass;

Third, it appears that the lead in the mold glass is reduced to metallic lead during the pressing process inasmuch as microscopic-sized pits are developed in the mold surface which seem to be centered about particles of elemental lead, those imperfections having adverse effects on both the mold lifetime and the lifetime of the metal master from which the mold itself is pressed;

Fourth, the viscosity curves of the current mold glasses are relatively shallow which is manifested by the quite large temperature interval between the annealing and softening points thereof, viz., about 165°-185° C.; and Fifth, the linear coefficients of thermal expansion of the mold glasses are relatively high, resulting in a less than optimum mismatch in coefficient of thermal expansion between the lens glass and mold glass.

Therefore, the primary objective of the present invention was to devise glass compositions which, by avoiding the above five drawbacks, would be eminently suitable for the forming of glass molds for use in pressing optically finished glass lenses.

A specific objective of the instant invention was to design glass compositions especially suitable in the construction of glass molds for use in contact with alkali metal fluoroaluminophosphate glass compositions of the type disclosed in U.S. Pat. No. 4,362,819, supra, and alkali metal, alkaline earth metal, zinc phosphate glass compositions of the type disclosed in Ser. No. 599,751 above.

SUMMARY OF THE INVENTION

I have found a narrow range of glass compositions within the base $ZnO—Al_2O_3—P_2O_5$ system which function particularly well as mold materials for use in pressing optically finished glass lenses. Such glasses consist essentially, expressed in terms of mole percent on the oxide basis, of 34-56% ZnO, 4-14% $Al_2O_3$, and 40-52% $P_2O_5$. Glasses having $Al_2O_3$ contents within the upper extreme of the operable range are preferred because of their superior chemical durability. A number of optional oxides may be included in minor amounts to alter the properties of the glasses. To illustrate:

(1) replacing part of the ZnO content with SnO yields stable glasses with lower annealing points without substantially raising the thermal expansion;

(2) replacing a portion of the ZnO with an alkali metal oxide or with $Sb_2O_3$ produces glasses demonstrating lower annealing points and higher coefficients of thermal expansion; and (3) replacing part of the ZnO with CaO and/or SrO and/or BaO has little effect upon the annealing points of the glasses, but does cause a rise in the coefficient of thermal expansion.

Nevertheless, to assure that the desired objectives of the instant invention will be achieved, the sum of ZnO, $Al_2O_3$, and $P_2O_3$ will constitute at least 85% of the total composition. That is, the total of extraneous components will not exceed 15% and the five above-mentioned optional ingredients will be limited as follows: up to 5% total $Li_2O$ and/or $Na_2O$ and/or $K_2O$; up to 15% total of CaO and/or SrO and/or BaO; and up to 5% $Sb_2O_3$.

An additional very practical benefit regarding the melting of the glass arises from the fact that they can be produced from batches consisting solely of metal phosphates, e.g., zinc orthophosphate and aluminum metaphosphate, and metal oxides. Thus, volatile phosphorus-containing batch materials, such as anhydrous $P_2O_5$, ammonium phosphate, and phosphoric acid, are not required. As a consequence, the glass batches can be melted directly in contact with platinum, as opposed to silica or alumina, thereby assuring greater chemical homogeneity and higher purity.

The inventive glasses are deemed to be less susceptible to attack by fluorine and the bulk compositions are much closer to those of the current alkali metal fluoroaluminophosphate lens glasses, thereby reducing the chemical potential gradients at the interface between the lens and the mold. The absence of readily reducible cations in the inventive glasses removes the possibility of pitting developing in the mold surface, such as has been experienced in the current lead silicate glass molds. Operationally, the use of the inventive glasses in place of the currently employed lead silicate glasses has resulted in an increase in metal master lifetime of about two orders of magnitude and an increase in mold lifetime by a factor of at least five. Furthermore, the inventive glasses have steeper viscosity curves than the current lead silicate mold glasses (a temperature interval between the annealing and softening points of less than 160° C., typically about 100°-150° C.), allowing them to be molded at somewhat lower temperatures, while having the same viscosity as the lead silicate glasses at the lens pressing temperature. Finally, the inventive glasses exhibit lower linear coefficients of thermal expansion ($\approx 50-80 \times 10^{-7}$/°C. over the temperature range 25°-300° C.) than the current lead silicate mold glasses, thereby leading to a greater mismatch in expansion between the lens and mold, and providing the basis for a greater tendency for the lens to separate from the mold upon cooling.

In the interest in ease of moldability, the softening points of the inventive glasses will preferably be below 620° C., more preferably below 590° C. As a measure of chemical durability, the inventive glasses will experience a weight loss after immersion in boiling deionized water for six hours no greater than 0.5%, preferably less than 0.1%.

Whereas it is not mathematically possible to convert composition ranges expressed in terms of mole percent to exact composition ranges expressed in terms of weight percent, the following values represent approximations of the base compositions of the inventive glasses in terms of weight percent: 23-32% ZnO; 3.5-13.5% $Al_2O_3$; and 52-64% $P_2O_5$.

PRIOR ART

U.S. Pat. No. 2,381,925 (Pincus) describes the preparation of glass compositions consisting essentially, in parts by weight on the oxide basis, of 1-30 ZnO, 10-20 $Al_2O_3$, and 60-85 $P_2O_5$. Whereas there is a minor proportion of overlap between those ranges and the composition intervals demanded in the present inventive glasses, not only is there no direct mention or even a vague suggestion of utilizing the glasses of the patent in the fabrication of molds for pressing optically finished glass lenses therein, but also the single working example provided in the patent (10 ZnO, 18 $Al_2O_3$, and 72 $P_2O_5$) is significantly outside the composition intervals of the present invention, and the patent approves the substitution of PbO for ZnO in the glass, a substitution unqualifiedly rejected in the instant invention.

U.S. Pat. No. 2,400,147 (Hooley) discloses the formation of glasses exhibiting fluorescence. The base glasses therefor consisted approximately of the equimolecular binary composition ZnO—$P_2O_5$ which were caused to luminesce through the addition of SnO and/or MnO thereto. The preferred glass compositions consisted essentially, by weight, of 60-71% $P_2O_5$, 20-35% ZnO, and >4% $Al_2O_3$ to which is added 2-12% SnO and/or 0-2.5% MnO. Whereas there is partial overlap between those compositions and those of the instant inventive glasses, there is no reference whatever to glass molds, much less to the exceptional utility of such glasses for that application. Moreover, the two working examples furnished in the patent consisted of compositions outside of the ranges required in the present invention.

U.S. Pat. No. 2,434,281 (Moulton) discusses a method for producing phosphate-based glasses whereby the batch ingredients are combined in a liquid to promote a chemical reaction therebetween. The three working examples supplied in the patent have compositions outside of the ranges required in the instant invention.

U.S. Pat. No. 2,577,627 (Pincus) reports the preparation of glasses having compositions within the base RO—$Al_2O_3$—$B_2O_3$—$P_2O_5$ system; more specifically, compositions consisting essentially, in weight percent, of 1-12% RO, 1-8% $B_2O_3$, 5-9% $Al_2O_3$, and 72-85% $P_2O_5$, wherein RO consists of at least one metal oxide selected from the group of BeO, MgO, CaO, and ZnO. Such glasses are outside the composition intervals required in the present invention.

U.S. Pat. No. 3,979,322 (Alexeev et al.) is directed to glasses for use in laser applications having base compositions consisting, in mole percent, of 1-30% alkali metal oxides, 20-45% Group II metal oxides, 35-49% $P_2O_5$, 0.1-25% $Nd_2O_3$, and 0-27% $Al_2O_3$ and/or $B_2O_3$ and/or $Nb_2O_5$ and/or PbO. Whereas there can be partial overlap between those broad ranges and the narrow composition intervals required in the present inventive glasses, no mention is made of forming glass molds from the glasses of the patent, and none of the working examples provided in the patent had a composition coming within the ranges of the instant inventive glasses.

U.S. Pat. No. 4,248,732 (Myers et al.) is drawn to glasses designed for laser use consisting essentially, in mole percent, of 5-40% alkali metal oxides, 5-30% Group II oxides, 0.1-15% $R_2O_3$, 35-65% $P_2O_5$, and 0.01-7% $Nd_2O_3$. Whereas there can be partial overlap between those broad ranges and the narrow composition intervals of the present inventive glasses, there is no reference to preparing glass molds from the glasses of the patent, and none of the working examples supplied in the patent is even marginally close to the composition ranges demanded in the present inventive glasses.

U.S. Pat. No. 4,439,530 (Tajima) is concerned with optical glasses having base compositions consisting essentially, in weight percent, of 3-30% $Na_2O$ and/or $K_2O$, 8-65% PbO, 1-45% $Ta_2O_5$, and 18-38% $P_2O_5$, and which may optionally contain up to 25% ZnO. The presence of PbO and other readily-reducible metal oxides is specifically eschewed in the instant inventive glasses. Hence, the glasses of the patent would not be suitable for the purpose of the present invention; viz., the fabrication of glass molds for use in pressing optically finished glass lenses.

U.S. Pat. No. 4,940,677 (Beall et al.) describes zinc-containing phosphate glasses exhibiting low transition temperatures consisting essentially, in mole percent, of 10-35% alkali metal oxides, 23-55% ZnO, and 28-40% $P_2O_5$ with, optionally, up to 6% $Al_2O_3$. The minimum content of alkali metal oxide is twice that which can be tolerated in the instant inventive glasses.

U.S. Pat. No. 4,874,724 (Beall et al.) discloses the preparation of glass-ceramic articles through the heat treatment of precursor glass articles consisting essentially, in mole percent, of 5-25% alkali metal oxides, 35-50% ZnO, 0.75-6% $Al_2O_3$, and 29-37% $P_2O_5$. The maximum level of $P_2O_5$ is below the minimum required in the instant inventive glasses.

DESCRIPTION OF PREFERRED EMBODIMENTS

Table I records a group of glass compositions melted on a laboratory scale and reported in terms of parts by weight on the oxide basis illustrating the present invention. Because the sum of the individual components totals or very closely approximates 100, for all practical purposes the tabulated values may be deemed to represent weight percent. Table IA recites the same group of glass compositions expressed in terms of mole percent on the oxide basis. The actual batch ingredients may comprise any materials, either oxides or other compounds, which, when melted together, are converted into the desired oxides in the proper proportion. Nevertheless, as was observed above, the glasses of the invention can be advantageously prepared from metal phosphate and metal oxide batch materials.

The batch ingredients were compounded, tumble mixed together to aid in securing a homogeneous metal, and then charged into platinum crucibles. Although the glasses reported in Table I reflect laboratory scale melts only, it will be appreciated that large melts thereof can be made in commercial melting units. The crucibles were introduced into a furnace operating at about 1250°–1400° C. and the batches melted for about 3 hours. The melts were thereafter poured into steel molds to produce glass slabs having the dimensions of about 4"×4"×1" which were transferred immediately to an annealer operating at about 400°–450° C.

TABLE I

|       | 1    | 2    | 3    | 4    | 5    | 6    | 7    | 8    |
|-------|------|------|------|------|------|------|------|------|
| ZnO   | 37.4 | 33.1 | 30.0 | 24.5 | 27.9 | 31.0 | 28.4 | 28.6 |
| SnO   | —    | —    | —    | 5.8  | —    | —    | —    | —    |
| $Al_2O_3$ | 7.0 | 9.2 | 10.0 | 8.8 | 9.8 | 9.3 | 9.6 | 9.0 |
| $P_2O_5$ | 55.5 | 57.7 | 59.6 | 61.0 | 62.3 | 58.0 | 60.3 | 62.4 |
| $Li_2O$ | — | — | — | — | — | 0.3 | 0.3 | — |
| $Na_2O$ | — | — | — | — | — | 0.6 | 0.6 | — |
| $K_2O$ | — | — | — | — | — | 0.9 | 0.8 | — |
| $Sb_2O_3$ | — | — | 0.5 | — | — | — | — | — |

|       | 9    | 10   | 11   | 12   | 13   | 14   | 15   | 16   |
|-------|------|------|------|------|------|------|------|------|
| ZnO   | 25.8 | 27.5 | 20.8 | 30.8 | 26.2 | 18.9 | 29.9 | 22.5 |
| BaO   | —    | 6.7  | 12.9 | —    | —    | 13.0 | —    | 12.9 |
| CaO   | —    | —    | —    | —    | —    | 2.4  | —    | —    |
| SnO   | —    | —    | —    | 3.4  | —    | —    | —    | —    |
| $Sb_2O_3$ | — | — | — | — | — | — | 1.0 | — |
| $Al_2O_3$ | 9.9 | 8.9 | 9.0 | 9.1 | 11.7 | 8.6 | 9.9 | 8.1 |
| $P_2O_5$ | 62.6 | 56.0 | 56.6 | 56.8 | 62.1 | 57.1 | 59.2 | 56.5 |
| $Li_2O$ | 0.3 | 0.1 | 0.1 | — | — | — | — | — |
| $Na_2O$ | 0.6 | 0.3 | 0.3 | — | — | — | — | — |
| $K_2O$ | 0.8 | 0.4 | 0.4 | — | — | — | — | — |

TABLE IA

|       | 1    | 2    | 3    | 4    | 5    | 6    | 7    | 8    |
|-------|------|------|------|------|------|------|------|------|
| ZnO   | 50.0 | 45.0 | 41.5 | 35.0 | 39.0 | 42.0 | 39.0 | 40.0 |
| SnO   | —    | —    | —    | 5.0  | —    | —    | —    | —    |
| $Al_2O_3$ | 7.5 | 10.0 | 11.0 | 10.0 | 11.0 | 10.0 | 10.5 | 10.0 |
| $P_2O_5$ | 42.5 | 45.0 | 47.3 | 50.0 | 50.0 | 45.0 | 47.5 | 50.0 |
| $Li_2O$ | — | — | — | — | — | 1.0 | 1.0 | — |
| $Na_2O$ | — | — | — | — | — | 1.0 | 1.0 | — |
| $K_2O$ | — | — | — | — | — | 1.0 | 1.0 | — |
| $Sb_2O_3$ | — | — | 0.2 | — | — | — | — | — |

|       | 9    | 10   | 11   | 12   | 13   | 14   | 15   | 16   |
|-------|------|------|------|------|------|------|------|------|
| ZnO   | 36.0 | 38.5 | 30.5 | 42.5 | 36.9 | 27.5 | 41.5 | 33.0 |
| BaO   | —    | 5.0  | 10.0 | —    | —    | 10.0 | —    | 10.0 |
| CaO   | —    | —    | —    | —    | —    | 5.0  | —    | —    |
| SnO   | —    | —    | —    | 2.5  | —    | —    | —    | —    |
| $Sb_2O_3$ | — | — | — | — | — | — | 0.4 | — |
| $Al_2O_3$ | 11.0 | 10.0 | 10.5 | 10.0 | 13.1 | 10.0 | 11.0 | 9.5 |
| $P_2O_5$ | 50.0 | 45.0 | 47.5 | 45.0 | 50.0 | 47.5 | 47.1 | 47.5 |
| $Li_2O$ | 1.0 | 0.5 | 0.5 | — | — | — | — | — |
| $Na_2O$ | 1.0 | 0.5 | 0.5 | — | — | — | — | — |
| $K_2O$ | 1.0 | 0.5 | 0.5 | — | — | — | — | — |

Table II records the softening point (S.P.) and annealing point (A.P.) in °C., the difference in temperature (ΔT) between the softening point and annealing point, and the linear coefficient of thermal expansion (Exp) over the temperature range 25°–300° C. expressed in terms of $10^{-7}/°C$. Those values were determined in accordance with measuring techniques conventional in the glass art. Table II also reports the weight loss (W.L.) expressed in percent exhibited by the glasses after an immersion for six hours in boiling deionized water.

TABLE II

|       | 1    | 2    | 3    | 4    | 5    | 6    | 7    | 8    |
|-------|------|------|------|------|------|------|------|------|
| S.P.  | 547  | 566  | 572  | 605  | 609  | 520  | 526  | 596  |
| A.P.  | 433  | 436  | 429  | 462  | 467  | —    | —    | 457  |
| ΔT    | 114  | 130  | 143  | 143  | 142  | —    | —    | 139  |
| Exp   | 59   | 57   | 57   | 61   | 58   | 70   | 71   | 60   |
| W.L.  | 0.01 | 0.07 | 0.25 | 0.03 | 0.49 | 0.06 | 0.10 | 0.25 |

|       | 9    | 10   | 11    | 12   | 13   | 14    | 15   | 16    |
|-------|------|------|-------|------|------|-------|------|-------|
| S.P.  | 542  | 553  | 564   | 593  | 603  | —     | 582  | 582   |
| A.P.  | —    | 426  | 446   | 451  | 441  | —     | 429  | —     |
| ΔT    | —    | 127  | 118   | 142  | 162  | —     | 153  | —     |
| Exp   | 70   | 69   | 77    | 55   | 57   | —     | 60   | 76    |
| W.L.  | 0.04 | 0.05 | <0.01 | 0.04 | 0.5  | <0.01 | 0.31 | <0.01 |

Based upon an overall review of physical properties and melting and forming characteristics, the preferred compositions of the present inventive glasses consist essentially, in mole percent, of b 36–53% ZnO, 7–12% $Al_2O_3$, and 40–50% $P_2O_5$ with up to 15% total SrO and/or CaO and/or BaO. The most preferred glass composition is Example 16.

I claim:

1. A glass exhibiting a softening point between 500°–620° C., a linear coefficient of thermal expansion (25°–300° C.) between $50-80\times10^{-7}/°C.$, a temperature interval between the softening point and annealing point of 100°–160° C., and a weight loss after exposure to boiling water for six hours no greater than 0.5% consisting essentially, expressed in terms of mole percent on the oxide basis, of 34–56% ZnO, 4–14% $Al_2O_3$, 40–52% $P_2O_5$, the sum of $ZnO+Al_2O_3+P_2O_5$ constituting at least 85% of the total composition.

2. A glass according to claim 1 also containing up to 15% total of oxides selected from the group in the indicated proportions consisting of up to 5% total of $Li_2O$ and/or $Na_2O$ and/or $K_2O$, up to 5% $Sb_2O_3$, and up to 15% total of CaO and/or SrO and/or BaO.

3. A glass according to claim 1 consisting essentially of 36–53% ZnO, 7–12% $Al_2O_3$, and 40–50% $P_2O_5$.

4. A glass mold for press molding optically finished glass lenses prepared from a glass exhibiting a softening point between 500°–620° C., a linear coefficient of thermal expansion (25°–300° C.) between $50-80\times10^{-7}/°C.$, a temperature interval between the softening point and annealing point of 100°–160° C., and a weight loss after exposure to boiling water for six hours no greater than 0.5% and consisting essentially, expressed in terms of mole percent on the oxide basis, of 34–56% ZnO, 4–14% $Al_2O_3$, 40–52% $P_2O_5$, the sum of $ZnO+Al_2O_3+P_2O_5$ constituting at least 85% of the total composition.

5. A glass mold according to claim 4 wherein said glass also contains up to 15% total of oxides selected from the group in the indicated proportions consisting of up to 5% total of $Li_2O$ and/or $Na_2O$ and/or $K_2O$, up to 5% $Sb_2O_3$, and up to 15% total of CaO and/or SrO and/or BaO.

6. A glass mold according to claim 1 wherein said glass consists essentially of 36–53% ZnO, 7–12% $Al_2O_3$, and 40–50% $P_2O_5$.

* * * * *